US006421655B1

(12) United States Patent
Horvitz et al.

(10) Patent No.: US 6,421,655 B1
(45) Date of Patent: Jul. 16, 2002

(54) COMPUTER-BASED REPRESENTATIONS AND REASONING METHODS FOR ENGAGING USERS IN GOAL-ORIENTED CONVERSATIONS

(75) Inventors: Eric Horvitz, Kirkland; Timothy S. Paek, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/326,254

(22) Filed: Jun. 4, 1999

(51) Int. Cl.$^7$ .............................................. G06F 9/445
(52) U.S. Cl. ....................................................... 706/61
(58) Field of Search .................. 716/4; 707/6; 713/600; 706/61, 50, 11; 704/9

(56) References Cited

U.S. PATENT DOCUMENTS

| | | | | |
|---|---|---|---|---|
| 4,763,277 A | * | 8/1988 | Ashford et al. ................ | 706/47 |
| 4,809,219 A | * | 2/1989 | Ashford et al. ................ | 706/50 |
| 5,103,498 A | * | 4/1992 | Lanier et al. .................. | 706/58 |
| 5,290,381 A | * | 3/1994 | Luciw et al. .................. | 706/11 |
| 5,434,777 A | * | 7/1995 | Luciw . ........................... | 704/9 |

(List continued on next page.)

FOREIGN PATENT DOCUMENTS

WO     WO 98/03907 a     1/1998

OTHER PUBLICATIONS

Anthony Jameson, "Numerical Uncertainty Management in User and Student Modeling: An Overview of Systems and Issues" Department of Computer Science, University of Saarbrucken, Germany, (May 1996).*

Combining Agoric and Genetic Methods in Stochastic Design, Published in Nanotechnology, vol. 9, No. 3 (Sep.), pp. 274–284. Presented at The Fifth Foresight Conference on Molecular Nanotechnology, Nov. 5–8, 1997, Palo Alto, CA.*

(List continued on next page.)

Primary Examiner—Thomas Black
Assistant Examiner—Michael B. Holmes
(74) Attorney, Agent, or Firm—Amin & Turocy, LLP

(57) ABSTRACT

The use of a goal-understanding abstraction hierarchy in conjunction with Bayesian inference, decision-theoretic analyses of conversational and observational actions is disclosed to provide machinery for incremental refinement of an understanding about a user's goals through conversation with users. A computer-implemented method receives multiple classes of information regarding a user goal including visual and linguistic clues at a specific level of the abstraction hierarchy, to assess the goal. The method then determines a with a value-of-information analysis the utility of acquiring additional information via making additional observations or by explicitly querying the user versus making a decision to change the level of precision of the analysis of a user's goals. Throughout the analysis, a probability distribution is inferred about the goals of a user. This probability distribution is used in conjunction with a representation of utility of different outcomes to identify informational and navigational actions with the greatest expected utility. In one embodiment, the probability of the leading goal is inferred and used to drive decision making, for example, in assuming the relevance of particular sub-goals of the current goal, where the sub-goals are in a succeeding level of the hierarchy. The probability can be determined in one embodiment by a Bayesian network. If the highest probability sub-goal exceeds a progression threshold, which can be determined by an approximate decision analysis, then this sub-goal is proceeded to in one embodiment—that is, the current level is advanced to the succeeding level, and information gathering is initiated at this new level.

55 Claims, 8 Drawing Sheets

U.S. PATENT DOCUMENTS

| | | | | |
|---|---|---|---|---|
| 5,477,447 A | * | 12/1995 | Luciw et al. | 704/9 |
| 5,608,624 A | * | 3/1997 | Luciw | 707/532 |
| 5,621,903 A | * | 4/1997 | Luciw et al. | 345/708 |
| 5,625,814 A | * | 4/1997 | Luciw | 707/5 |
| 5,644,735 A | * | 7/1997 | Luciw et al. | 345/708 |
| 5,748,841 A | | 5/1998 | Morin et al. | 704/257 |
| 5,774,357 A | * | 6/1998 | Hoftberg et al. | 713/600 |
| 5,809,499 A | * | 9/1998 | Wong et al. | 707/6 |
| 5,822,218 A | * | 10/1998 | Moosa et al. | 716/4 |
| 5,864,848 A | | 1/1999 | Horvitz et al. | 707/6 |
| 6,327,581 B1 | | 12/2001 | Platt | 706/12 |

OTHER PUBLICATIONS

Decision–theoretic Planning, Jim Blythe, Feb. 11, 1999.*

Morphological Tagging Based Entirely on Bayesian Inference, Christer Samuelsson, Stockholm, (1994).*

Bauer, Logic–based plan recognition for intelligent help systems, Current trends in AI planning, European workshop on planning, pp. 60–73, no date.

Raskutti, Generation and selection of likely interpretations during plan recognition in task–oriented consultation systems, User modeling and user–adapted interaction, vol. 1, No. 4, 1991, pp. 323–353.

Horvitz, Principles of Mixed–initiative user interfaces, May 15–20, 1999, ACM, pp. 159–166.

Eric Horvitz, David Heckerman, et al., Heuristic Abstraction in the Decision–Theoretic Pathfinder System, Proceedings of the Thirteenth Symposium on Computer Applications in Medical Care, IEEE Computer Society Press, 1989.

David Heckerman, Eric Horvitz, Inferring Informational Goals from Free–Text Queries: A Bayesian Approach, Fourteenth Conference on Uncertainty in Artificial Intelligence, 1998.

Stephen D. Richardson, William B. Dolan, Lucy Vanderwende, MindNet: acquiring and structure semantic information from text, MSR–TR–98–23, Proceedings of the 17th International Conference on Computational Linguistics, May 29, 1998.

Stephen D. Richardson, Bootstrapping Statistical Processing into a Rule–based Natural Language Parser, MSR–TR–95–48, Proceedings of Workshop, The Balancing Act: Combining Symbolic and Statistical Approaches to Language, Jul. 1994.

Stephen D. Richardson, Lucy Vanderwende, William Dolan, Combining Dictionary–Based and Example–Based Methods for Natural Language Analysis, MSR–TR–93–08, Jun. 1993.

Goodwin, Between and within: Alternative sequential treatments of continuers and assessments, Human Studies, 1986(9), pp. 205–217.

Grice, Meaning, Philosophical Review, 1957 (66), pp. 377–388.

Grice, Logic and conversation, Syntax and Semantics 3: Speech Acts, 1975, pp. 41–58.

Jefferson, Side Sequences, Studies in Social Interaction, 1972, pp. 294–338.

Schegloff and Sacks, Opening up closings, Semiotica, 1973, pp. 289–327.

Clark, Making sense of nonce sense, The Process of Language Understanding, 1983, pp. 297–331.

Cohen and Levesque, Preliminaries to a collaborative model of dialogue, Speech Communication, 1994 (15), pp. 265–274.

Clark and Wilkes–Gibbs, Referring as a Collaborative Process, chapter 23 of Intentions in Communication, 1990.

Platt, Fast Training of Support Vector Machines Using Sequential Minimal Optimization, chapter 12 of Advances in Kernel Methods: Support Vector Learning, 1999.

Clark and Brennan, Grounding in Communication, chapter 7 of Perspectives on Socially Shared Cognition, 1991.

Herbert H. Clark, Using Language, 1996, chapters 5 (Meaning and Understanding), 1 (Language Use) and 13 (Conclusion), and pp. 222–226.

Araki M, Doshita S, Cooperative Spoken Language Model Using Bayesian Network and Event Hierarchy, IEICE Transaction on Information and Systems, vol. E78–D No. 6, Jun. 1995, pp. 629–635, XP002148396, Japan.

Inspec Database, Institute of Electrical Engineers, Stevenage, GB, Inui K et al, A framework of decision–theoretic utterance planning, database accession No. 5757396, XP002148397, abstract, Journal of Japanese Society for Artificial Intelligence, Sep. 1997, Japanese Soc Artificial Intelligence, Japan, ISSN 0912–8085, vol. 12, pp. 760–769, 1997.

* cited by examiner

COMPUTER-BASED REPRESENTATIONS AND REASONING METHODS FOR ENGAGING USERS IN GOAL-ORIENTED CONVERSATIONS

FIELD OF THE INVENTION

This invention relates generally to computer-user interaction, and more particularly to such interaction between a computer and human that might be termed a conversation, accomplished through the use of a task abstraction hierarchy in combination with methods for inferring a user's goals under uncertainty from both linguistic and nonlinguistic information, computing the most important information it should gather to resolve that uncertainty, and for making decisions about progression or backtracking in the abstraction hierarchy

BACKGROUND OF THE INVENTION

Generally, computer-user interaction has focused on the user conforming more to idiosyncrasies of the computer than vice-versa. For example, while users in non-computer interactions (such as human-human interactions) typically communicate with a combination of verbal and nonverbal signals, this is generally not done with computer-user interactions. Rather, the user is forced to input information into a computer in a manner more easily understood by the computer—such as constrained voice inputs, text input from a keyboard, pointing, movement and clicking input from a mouse, etc. As a result, this imposed unnaturalness of the computer-user interface has played a part in hampering efforts to make computers easier to use and more an intuitive part of everyday life.

Interactive dialog in conversation lays at the foundation of communication between humans, where each has distinct needs, goals, and information. Conversations are typically initiated with the intention of acquiring, sharing, or critiquing information, and to express needs or request services. In general, information gathering and decision making under uncertainty play central roles in conversation. This may be at least part of the reason why there has been difficulty in attaining more natural computer-user interactions in computer-user conversation.

This difficulty is compounded by the fact that conversation is not just an auditory mode of communication. Rather, other types of information about one party can indicate to the other party how to react in conversation. For example, someone's appearance, behavior, spatial configuration, and props (viz., carried items), may all be considered when determining how to proceed with a conversation. Generally, however, the prior art relating to computer-user interactions through conversation has not focused on non-linguistic information regarding the user. Also, most interactions with computer systems do not allow for an interactive discussion about uncertainties and for the incremental inquiry of additional information via questioning or via directing information gathering to inspect a variety of sources of information including, distinctions recognized in an automated parsing of utterances with a natural language understanding system, words and phrases spotted in utterances, and a variety of acoustical and visual cues.

There is a need, therefore, for improved conversational computer-user interactions, to provide for more intuitive and natural communication between a user and a computer. For this and other reasons, there is a need for the present invention.

SUMMARY OF THE INVENTION

The invention relates to accomplishing computer-user interaction using a task abstraction hierarchy of user goals organized into a set of distinct levels of precision for engaging in dialog about a user's goals. In one embodiment, a computer-implemented method receives or actively inquires about information regarding a user's goal (i.e., the purpose of the computer-user interaction from the user's standpoint) at a current level of the abstraction hierarchy, to assess and refine the goal. The method determines the sufficiency of the information received, for example, by performing probabilistic inference from information already gathered to assign a probability to alternate goals of the user, and of performing a value-of-information analysis to acquire new information. If the information received is insufficient, then more information is received from the user, inference is performed, and the sufficiency is again assessed, centering on a decision-analytic assessment of the probability assigned to one or more leading hypotheses about the user's goals. Depending on a decision-analytic assessment with the current information, the system can either seek to acquire more information, assume a goal at the precision represented by the current level and then progress to an analysis of more specific goals at the next level of detail in the hierarchy, or can seek confirmation of the goal from the user before making the transition to the next level of analysis. The probability of alternate goals at each level are determined in one embodiment by a Bayesian network. In that embodiment, the goal with the leading probability is used to make such decisions. If the highest probability sub-goal exceeds a progression threshold as determined by a decision analysis that considers the costs and benefits of progressing, then this sub-goal is proceeded to—that is, the current level is advanced to the succeeding level—and information analysis and acquisition is initiated again at this new level.

The use of a task abstraction hierarchy provides for advantages not found in the prior art. Decomposing the user's goals into several layers allows for guiding conversation on a path of natural convergence towards shared understanding at progressively greater detail. Multiple levels also allow for the establishment of a common ground about uncertainties at each level, and for conversation about comprehension or misunderstandings at specific levels before progressing to the next level. The information gathered can include non-linguistic information, such as visual information regarding the user, in addition to linguistic information.

Embodiments of the invention include computer-implemented methods, computer-readable media, and computerized systems of varying embodiments. Still other embodiments, advantages and aspects of the invention will become apparent by reading the following detailed description, and by reference to the drawings.

DETAILED DESCRIPTION OF THE INVENTION

In the following detailed description of exemplary embodiments of the invention, reference is made to the accompanying drawings which form a part hereof, and which shows by way of illustration specific exemplary embodiments the invention may be practiced. These embodiments are described in sufficient detail to enable those skilled in the art to practice the invention, though it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
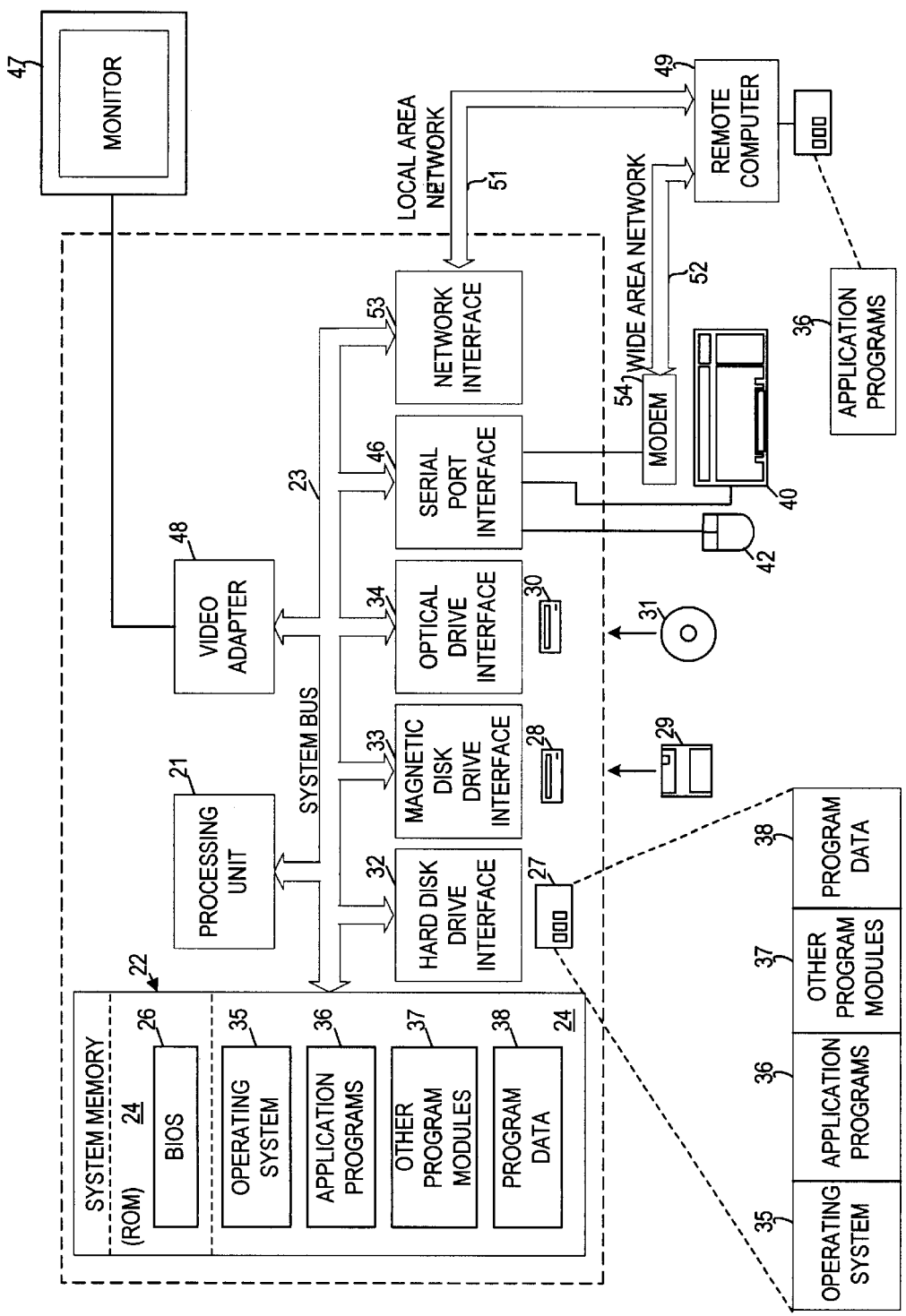
FIG. 1 is a diagram of an operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Task Abstraction Hierarchy for Understanding a User's Goals

In this section of the detailed description, the general concept of using a task abstraction hierarchy, representing different levels in precision in understanding a user's goals to provide for conversational computer-user interaction, is described. In at least some embodiments of the invention, the task abstraction hierarchy is important to achieve improved computer-user interaction.

As alluded to in the background section, an important aspect of dialog is the ongoing reasoning and decision making about the nature of the information or goals being communicated. Information gathering and decision making under uncertainty play central roles in conversation. The management of uncertainty is often important in the formulation of discriminating questions that promise to be useful for disambiguating key uncertainties, and for guiding dialog to appropriate levels of detail at which to exchange information or to ask questions.

The task abstraction hierarchy that is described is useful in at least some embodiments of the invention for a computer's management of uncertainty in a conversation with a user, in particular (but not limited to) in the context of a joint activity. A joint activity is a term used by psycholinguists to describe behavior that is a task-oriented, social event with constraints on the participants, setting, and most of all, on the kinds of contributions that are considered reasonable by each participant. Participants in a joint activity assume that they share a common set of beliefs about the activity, including assumed roles and responsibilities of the other participants. For example, a receptionist domain is a joint activity in which a receptionist assists others with tasks that the others expect the receptionist to be familiar with. That is, people assume that the primary task of the receptionist is to assist them achieve their activity-defined goals in a prompt, collaborative fashion.

Figure 2:
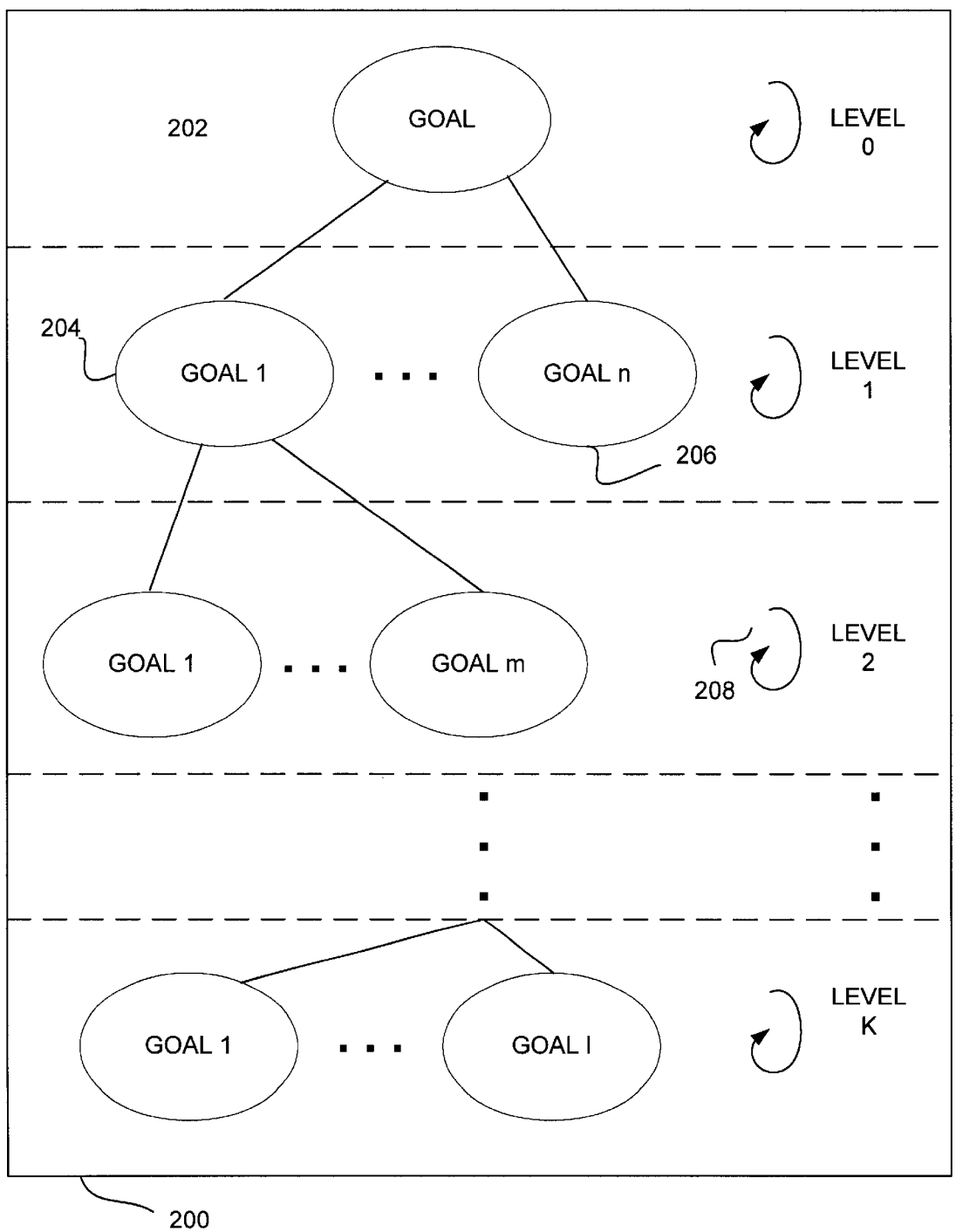
FIG. 2 is a diagram of a representative task abstraction hierarchy that can be used in accordance with embodiments of the invention.

Referring now to FIG. 2, a diagram of a representative task abstraction hierarchy that can be used in accordance with embodiments of the invention is shown. The task abstraction hierarchy 200 provides for decomposition of the problem of understanding a user's goal into diagnosis at successive levels of detail. This decomposition ultimately provides for improved computer-user interaction.

The task abstraction hierarchy 200 is divided into a number of levels 0 . . . k as shown in FIG. 2, such as the zeroth level 202. Each level has one or more goals, such as the goal 204 and the goal 206 of the first level. The zeroth level 202 includes the most abstract of the goals, indicating the fact that the user has a goal in the computer-user interactional context modeled by the hierarchy 200. Each goal of one level is successively refined into two or more goals in a next level, until at some level a goal cannot be further refined.

Thus, by reasoning about a user's goal at an initial abstract level, navigation of the task abstraction hierarchy 200 provides a manner by which proper information is sought vis-a-vis the current level of abstraction at which navigation is being performed, such that as the levels are navigated in a downward manner, more specific information regarding the user's goal is sought, in a manner consistent with that of human-human conversation. Information gathering at a given level is represented in FIG. 2 as a circular arrow, such as the circular arrow 208 for level 2.

For example, within the receptionist domain, in the context of a receptionist of a building within a large corporate campus, first level goals (i.e., goals 1 . . . n of level 1) may include: need to call a shuttle to go to another part of campus; need to enter the building; need to pick something up; need to drop something off; need for directions; desire for an answer to an informational query; need of help with a special project; desire for a pass for commuting via public transportation; desire to send a fax; desire to put up posters; request to remove posters. In one embodiment of the invention, to render the set of goals exhaustive, another goal, other, is used to refer to a goal not explicitly considered in this list.

The next level of goals, level 2, represents the refinement of the high-level goals into more specific needs. For example, the level 2 refinements of the goal of needing a shuttle to travel to another part of campus can include, in the context of the receptionist domain: shuttle to a main campus location for one person; shuttle to an auxiliary campus location for one person; shuttle to an external (off-site) location for one person; shuttle to a main campus location for a group; shuttle to an auxiliary campus location for one person; and, shuttle to an external (off-site) location for a group. Furthermore, the next level of goals, level 3, may consider the additional specification of the types of shuttles for special cases, such as transporting handicapped individuals, and for transporting senior executives in express shuttles.

Decomposition of a user's goals into several levels of detail allows for guiding conversation on a path of natural convergence toward shared understanding at progressively greater detail, as has been described. Multiple levels also allow for the establishment of a common ground regarding uncertainties at each level, and for conversation about comprehension or misunderstanding at specific levels before progression to the next level. Users can be directed, as part of a natural dialog about their goals, to implicitly or explicitly confirm or disconfirm a misunderstanding at one level, reducing uncertainty before progressing to the next level. Decomposition also focuses inference to more manageable models at each level.

As described in succeeding sections of the detailed description, the approach to dialog in at least some embodiments of the invention focuses on a computer-user collaboration to disambiguate goals at each level by asking the most informative questions or gathering the most valuable non-linguistic evidence at that level, and attempting to confirm the goal at that level. Given confirmation or strong belief in the speaker's goals at the current level, the system can then pass its evidence to the next more detailed level of analysis and attempt to refine its belief at that next level, until reaching a conclusion about the user's goals.

Refinement of Goals (Constructing the Task Abstraction Hierarchy)

In this section, the manner by which at least some embodiments of the invention provide for construction of the task abstraction hierarchy—that is, the manner by which goals are refined into other goals—is described. It is noted, however, that the invention is not limited to the manner described in this section.

As can be appreciated by those of ordinary skill within the art, Bayesian networks have the ability to fuse together the relevance of multiple classes of information. This allows for inference about the goals of a user, both from utterances (that is, auditory or linguistic information), and non-auditory information, such as visual information. Bayesian networks provide for the generation of a probability of each refined goal, given input information as well as any more abstract goal, if there are any. Having access to probabilities allows the computer to guide question asking based on the computation of value of information (as described in the next section of the detailed description).

In one embodiment of the invention, therefore, Bayesian networks are constructed for different levels of the task hierarchy. Desirably, the networks consider linguistic and non-linguistic observations. Non-linguistic observations provide additional contextual information, such as visual features about the appearance, location, and trajectory of locomotion of users (useful, for example, in the domain of the role served by a receptionist who handles a variety of people, questions, and needs at the front desk of a large building).

Linguistic Evidence (Observations

As can be appreciated by those of ordinary skill within the art, an aspect to achieving natural computer-user interactions in at least some embodiments of the invention is the ability of a computer to access linguistic observations from a user. Utterances from a user can vary in syntax, length, and typicality. Therefore, in this section of the detailed description, the accessing and processing of linguistic evidence according to an embodiment of the invention is described.

First, evocative sets of words and phrases are identified in utterances in the desired computer-user interactional context (e.g., a receptionist domain as has been described). These words and phrases are known in the art as metanyms. Automated natural language processing (NLP) can then be used to introduce higher-level linguistic abstractions, such as syntactic and semantic features, as observational variables in the Bayesian models, although this is not required by the invention. NLP is known in the art. In one embodiment, the NLP used is the system referred to as NLPwin, developed by the Microsoft Research Natural Language Processing Group. The invention is not so limited, however.

NLPwin is described in S. D. Richardson, Bootstrapping statistical processing into a rule-based natural language parser, in Proceedings of the Workshop on Combining Symbolic and Statistical Approaches to Language, pages 96–103 (1994). NLPwin is more specifically based on the system described in George E. Heidorn, Intelligent Writing Assistance, in A Handbook of Natural Language Processing Techniques (Marcel Dekker 1999) (R. Dale, et al., eds.) (ISBN 0-8247-9000-6); in Natural Language Processing: The PLNLP Approach, edited by Karen Jensen, George E. Heidorn and Stephen D. Richardson, Kluwer Academic Publishers, Boston, 1993 (ISBN 0792392795); and extended as described in S. D. Richardson, Lucy Vanderwende, William Dolan, Combining Dictionary-Based and Example-Based Methods for Natural Language Analysis, MSR-TR-93-08, June 1993; and in S. D. Richardson, William Dolan, Lucy Vanderwende, MindNet: acquiring and structuring semantic information from text, MSR-TR-98-23, May 29, 1998.

In NLPwin, the system yields syntactic, logical, and semantic cues, higher-level linguistic abstractions, that can be used for distinguishing between goals, by processing each utterance in five stages of analysis. In the first stage, the system segments the input utterance into individual tokens, analyzing words by their morphological structure and looking them up in online dictionaries, including sources specifically tailored for multi-word entries. In the second stage, referred to as the syntactic sketch, the system parses the utterance into its syntactic components based on rules of grammar. In the third stage, referred to as the syntactic portrait, the system resolves attachment ambiguities by using semantic relations culled from a compiled analysis derived from online dictionary definitions. The first three stages provide the Bayesian models with syntactic cues. In the fourth stage, the system resolves anaphoric references and constructs the logical form of the utterance, representing predicate-argument relations in a semantic graph by assigning sentence elements to functional roles, such as deep subjects and deep indirect objects. Finally, NLPwin attempts to determine the most appropriate sense for words in the utterance from a list of senses, yielding semantic cues.

Value of Information to Guide Observation and Dialog

In this section of the detailed description, gathering information via a value of information (VOI) (also described as an expected value of information (EVI) analysis), according to an embodiment of the invention, is described. For example, the manner by which information is gathered as described in this section can be represented as shown by circulator arrow 208 in FIG. 2, as has been described. That is, the information gathering manner described in this section is utilized to obtain information at the current level of the task abstraction hierarchy that has been described in conjunction with FIG. 2.

Identifying the most valuable additional observations to collect to resolve uncertainty and to enhance the value of actions ultimately taken in the real world is an important aspect in decision-theoretic diagnosis (or, analysis). Value of information (VOI) analysis, as known in the art, is employed to identify the best questions to ask and observations to make in light of the inferred probabilities of different goals or subgoals at some level of the task decomposition hierarchy, and in light of the costs of gathering the information, and the costs and benefits of taking action with and without the new information. That is, VOI yields the expected utility of evaluating different pieces of previously unobserved evidence, considering the informational value and the cost of making the observation under uncertainty. To compute VOI, for each observation that could be made, the expected utility of the best decision is associated with each value the observation may take on. The analysis then sums the expected utility for each value, weighted by the probabilities of seeing the different values should an observation be made.

Figure 3A:
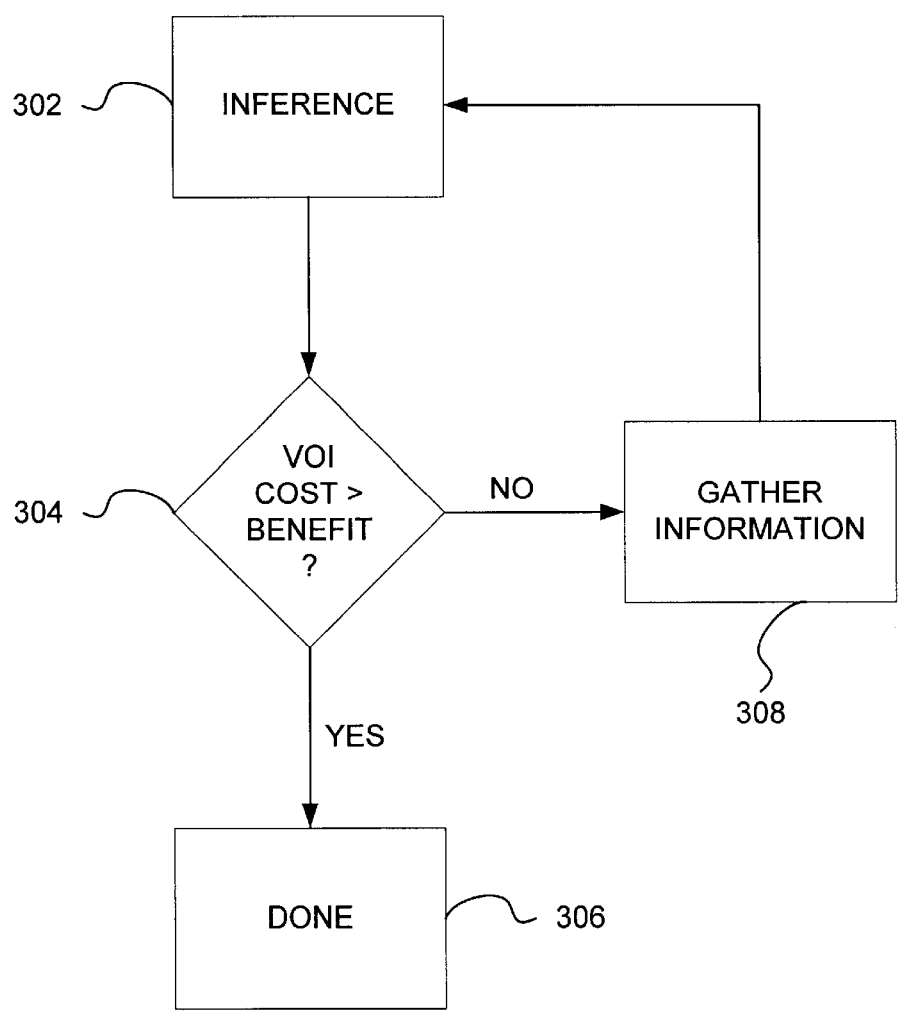
FIG. 3(a) is a flowchart of a method to gather information at a current level of a task abstraction hierarchy by conducting a value of information analysis, according to an embodiment of the invention.

A flowchart of a method of the VOI/EVI information-gathering process according to one embodiment of the invention is shown in FIG. 3(a). The computer-implemented method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

In 302, an inference is determined, based on currently available information, as to a user's goals and subgoals a t a current level of the task abstraction hierarchy. In 304, the expected utility of obtaining additional pieces of previously unobserved evidence is made, as well as the expected cost of obtaining this additional evidence, as described in the preceding paragraph. If there is no piece of evidence such that the cost of receiving that piece of evidence is less than the utility of the information, then the method proceeds to 306 and is finished. Otherwise, the method proceeds to 308, and the most useful information (i.e., the piece of evidence having the greatest utility) is gathered, for example, via a dialog. Another inference is then made in 302, and the process repeats until the cost of gathering any additional piece of evidence is greater than its utility. Thus, the method of FIG. 3(a) is advantageous in that it collects the best information it can based on a VOI analysis such that information is not gathered if the utility of gathering this information is not greater than its acquisition cost.

A more formal approach to considering costs and benefits is now described. The value for immediate action of an action A * is its expected utility, which can be written as:

$$eu(A^*)=\max_A \Sigma_j u(A_i,H_j)p(H_j|E)$$

where $u(A_i,H_j)$ is the utility of the particular action $A_i$ when the user has the goal $H_j$ and $p(H_j|E)$ is the probability of user goal $H_j$ given the current set of observed and background evidence E. Therefore, if another observation $e_x$ is made, then the new expected utility of the action $A^{*\prime}$ is:

$$eu(A^{*\prime})=\max_A \Sigma_j u(A_i,H_j)p(H_j|E,e_x=e_{x,k})$$

where $e_x$ may take on different values, $e_{x,k}$, depending on the outcome of the tests, The next value of taking the observation $e_x$ is, therefore, its expected utility of taking action having this observation, minus the expected utility of taking action without having this observation, minus the cost of taking the observation, $C(e_x)$, or:

$$VOI(e_x)=\Sigma_k p(e_{x,k}|E)*[\max_A \Sigma_j u(A_i,H_j)p(H_j|E,e_{x,k})]-\max_A \Sigma_j u(A_i,H_j)p(H_j|E)-C(e_x).$$

As can be appreciated by those of ordinary skill within the art, an exact computation of VOI requires consideration of all possible sequences of observations. However, greedy VOI, focusing on computing the next best single best piece of evidence to observe, is often a useful approximation of VOI, and can be utilized in an embodiment of the invention. Information-theoretic VOI, more specifically, can be utilized to identify the next best linguistic and non-linguistic evidence to observe to resolve the current uncertainty within the current level of the task abstraction hierarchy. Thus, the greedy VOI analysis is utilized within each level of the task abstraction hierarchy to control question asking and make decisions about accessing non-linguistic evidence. After each new observation is evaluated, as described in conjunction with the method of FIG. 3(a), the system updates the probabilities of distinct goals or subgoals within a level of the task hierarchy (that is, makes an inference), and recomputes the VOI.

Thus, within a level of the hierarchy, VOI continues until either the expected cost of evaluating observations exceeds the expected value of observations, and/or there are no additional observations to make (not described in the method of FIG. 3(a)), or a higher-level decision-theoretic analysis progresses the system to the next level, as described in the next section of the detailed description.

Navigation of Levels of the Task Abstraction Hierarchy

Figure 5:
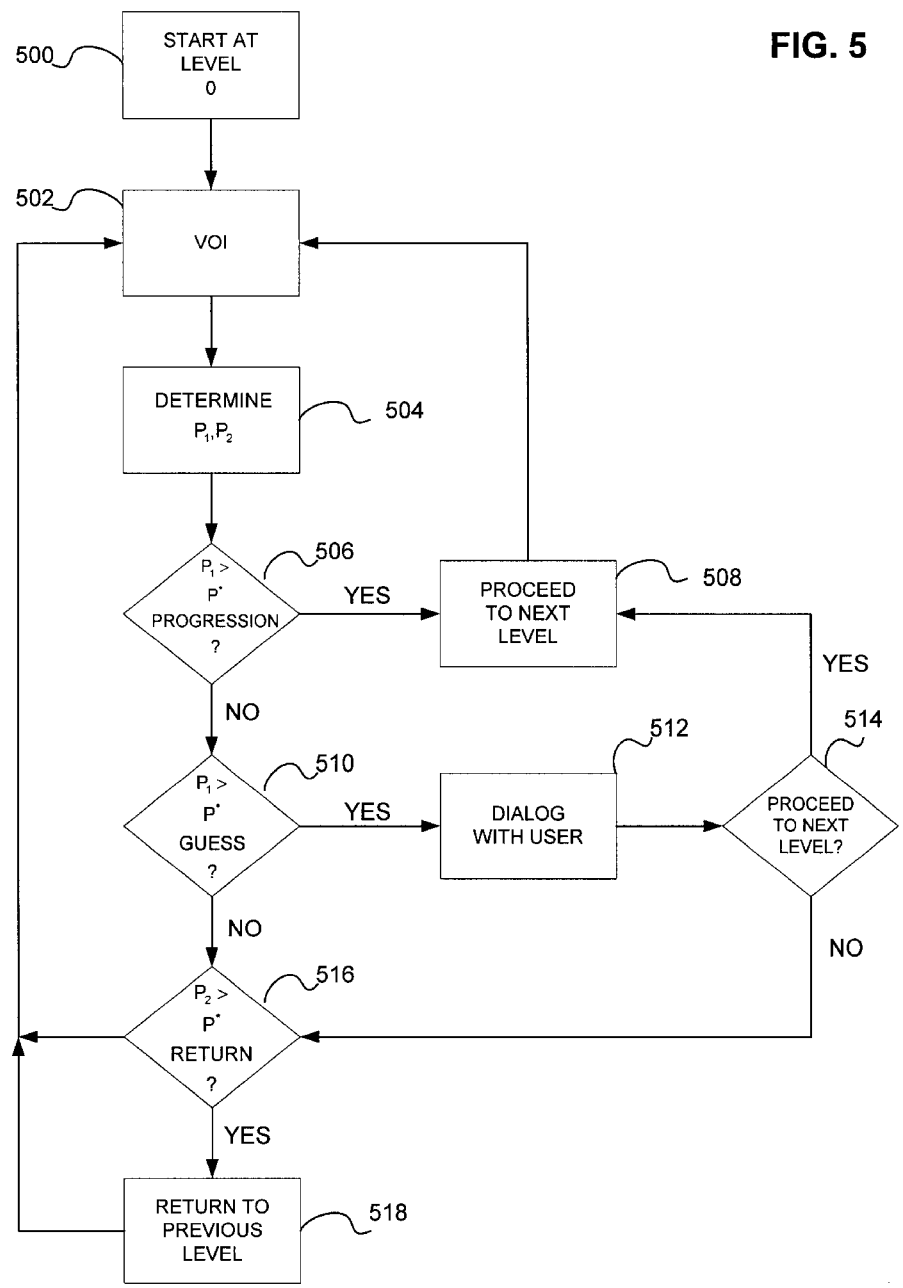
FIG. 5 is a flowchart of a method to navigate levels of a task abstraction hierarchy, according to an embodiment of the invention; and, FIG. 6 is a diagram of a system according to an embodiment of the invention.

In this section of the detailed description, the manner by which the progression and retreat among levels of the task abstraction hierarchy is performed according to an embodiment of the invention is described. In one particular embodiment, the manner is described in conjunction with a specific method, the flowchart of which is shown in FIG. 5. The invention is not so limited, however.

Given confirmed or strong belief in a goal at some level of detail, it may be appropriate to move on to perform inference, question asking, and confirmation about the goal at a more detailed level of analysis. At any point in a conversation, for instance, one of the participants may ask for direct confirmation about another participant's goals. However, explicitly guessing can be costly—a poor guess early in a conversation may appear unnatural and relay to a user a sense that the agent they are conversing with is rushing or simply not considering obvious clues. In particular, there is a great cost in posing a direct question about a goal in the situation where a human conversational partner would typically have understood the goal from the evidence provided. Alternatively, an agent may make an implicit decision to assume a goal at the current level, based on the probabilities of alternate goals, following information gathering. An erroneous guess here can be costly as users are not given the chance to converse about the decision.

Given this background, the method of FIG. 5 provides for a natural manner by which to navigate the levels of the task abstraction hierarchy. The computer-implemented method is desirably realized at least in part as one or more programs running on a computer—that is, as a program executed from a computer-readable medium such as a memory by a processor of a computer. The program is desirably storable on a machine-readable medium such as a floppy disk or a CD-ROM, for distribution and installation and execution on another computer.

In 500, the method starts at the top most level, level 0, specifically at the goal of this level. That is, the current level is set at the first level of the hierarchy. Then, in 502, information gathering is performed. That is, information is received regarding the current level of the task abstraction hierarchy to assess the goal of the user in a computer-user interaction context. The sufficiency of the information gathered in 502 is also assessed; if insufficient, then the method stays at 502 to gather additional information. 502 can be accomplished in one embodiment by a value of information analysis, as has been described in the previous section of the detailed description.

The information received in 502 can be of many types; the invention is not so limited. For example, it can by text information, audio information, image/video information, or other information. Receiving information is typically performed by interacting with the user, especially in the context of audio information (e.g., utterances). Thus, the method may first posit the user with (second) information in the form of a question, and then wait for a response thereto, such that a dialog is accomplished. The information posited by the method can also be audio information (e.g., speech), image/video information (e.g., the behavior of the agent on a display device), as well as other information. The invention is not so limited.

As can be appreciated by those of ordinary skill within the art, information received for a given level (and thus relevant to that level) may also be relevant to another, more detailed level of the hierarchy. Therefore, in at least some embodiments of the invention, information received for one level is made available to all levels, so that proper decisions can be generated.

Once the information received in 502 is determined to be sufficient—for example, in the context of a value-of-information (VOI) analysis, the expected cost of obtaining additional information is greater than the expected utility of that information—then two inference probabilities are determined in 504, in one specific embodiment, although the invention is not so limited, as is explained in greater detail below. The inference probabilities in one embodiment are generated by use of a Bayesian network.

In another embodiment of the invention, approximate decision analyses are performed, rather than complete decision analyses as described herein, as those of ordinary skill within the art can appreciate. Such analyses allow for the guiding of actions by considering a set of special probabilities about the goal with the highest probability. For example, a set of probability thresholds is developed to guide action, derived by considering the costs and benefits under uncertainty of taking action to confirming guesses prior to taking action, progressing without confirmation, continuing to gather information, and backtracking to revisit the next higher level of analysis. A manner by which such probability thresholds is developed is analogous to the approach described in the copending and coassigned application entitled "Systems and Methods for Directing Automated Services for Messaging and Scheduling," Ser. No. 09/295,146, and filed on Apr. 20, 1999, which is hereby incorporated by reference, as can be understood by those of ordinary skill within the art. That is, probability thresholds are determined not for "inaction" versus "dialog regarding action" versus "action," as described in the application filed Apr. 20, 1999, but rather for "taking action" versus "confirming prior to taking action" versus "progressing without confirmation" versus "continuing to gather information" versus "backtracking to revisit the next higher level of analysis."

Figure 3B:
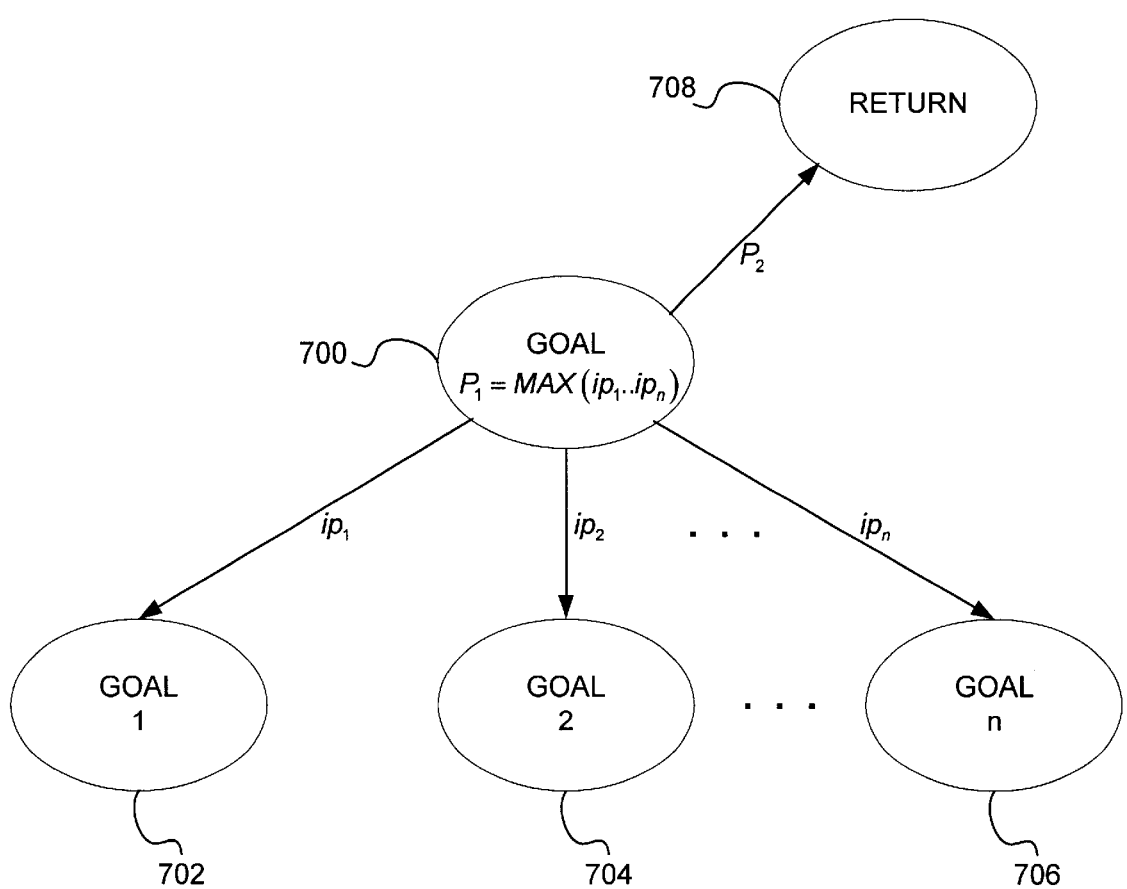
FIG. 3(b) is a diagram of a representative Bayesian network according to an embodiment of the invention.

The inference probabilities determined in 504 are described in particular detail by reference to the diagram of a Bayesian network in FIG. 3(b). It is noted, and as can be appreciated by those of ordinary skill within the art, that for purposes of illustrative clarity the Bayesian network of FIG. 3(b) does not indicate any informational inputs (viz., linguistic or non-linguistic observations), but rather only indicates the dependence of the refined goals 702, 704 and 706 (that is, the goals 1 . . . n) on the less-refined (or more abstract) goal 700.

That is, given the goal 700, and given informational inputs that have been assessed, there is an inference probability ip for each goal 702, 704 and 706 that a respective goal is the actual goal of the user. As defined for the purposes of this application, the inference probability p1 given the goal 700 is the maximum of the inference probabilities ip1 . . . ipn corresponding to goals 1 . . . n. The inference probabilities ip1 . . . ipn are referred to as initial inference probabilities. In other words, the refined goal 1 . . . n having the maximum likelihood given the abstract goal 700 is the refined goal 1 . . . n with the highest corresponding ip.

A second inference probability is also defined by reference to the Bayesian network of FIG. 3(b). The second inference probability is the probability p2 that the current level was proceeded to erroneously, and that the previous level should be retreated to, instead. In the context of FIG. 3(b), however, the return goal 708 is another sub-goal of the current goal 700.

In other words, in FIG. 3(b), the current goal of the current level is shown as the goal 700. This goal has n sub-goals, such as the sub-goals 702, 704 and 706, which all lie in the next level of the task abstraction hierarchy. The goal 700 also has a return sub-goal 708, which is the goal for retreating to the previous level of the task abstraction hierarchy. Each of the sub-goals 702, 704 and 706 have an inference probability, such that the first inference probability is the inference probability of the sub-goal having the maximum likelihood. Thus, an initial inference probability is determined for each sub-goal, and the first inference probability selected is the initial inference probability of the sub-goal having the highest probability. The second inference probability is the inference probability of the return sub-goal 708.

Referring back to FIG. 5, the determination of the first and the second inference probabilities is thus accomplished by a Bayesian network in one embodiment of the invention as has been described in conjunction with FIG. 3(b). Next, in 506 (and subsequently in 510), the first inference probability is analyzed against two thresholds: a progression threshold, and a guess threshold, which can be referred to as p* progression and p* guess, respectively.

If the first inference probability is greater than p* progression, as determined in 506, then this means that the probability is great enough to warrant progression to the next level of the abstraction hierarchy in 508—that is, advance the current level of the hierarchy to the next level, specifically at the maximum likelihood goal of the current level (that is, the goal having the highest initial inference probability). The method then returns to 502, to gather information at this next level.

If the first inference probability is not greater than p* progression, then the method instead proceeds to 510, where it is determined whether the probability is great enough to warrant procession to the next level of the abstraction hierarchy, but with confirmation from the user. Thus, a dialog is engaged in with the user in 512 regarding procession to the next level; if confirmed, then the method proceeds from 514 to 508, proceeding to the next level, and the method continues back at 502, gathering information at this new level. Otherwise, the method continues to 516.

516 is therefore reached if the first inference probability is neither greater than p* progression nor p* guess, or is greater than p* guess but the user did not confirm level advancement. In 516, it is then determined whether the previous level should be returned (retreated) to—if the second inference probability is greater than a threshold, which can be referred to as p* return, then the previous level is returned to 518, and the method goes back to 502 to receive information at the previous level (in one embodiment, in returning back to the previous level, an appropriate apology or justification is provided, to ensure naturalness of the conversation). Otherwise, the method returns to 502, and additional information is received at the current level.

Figure 4A:
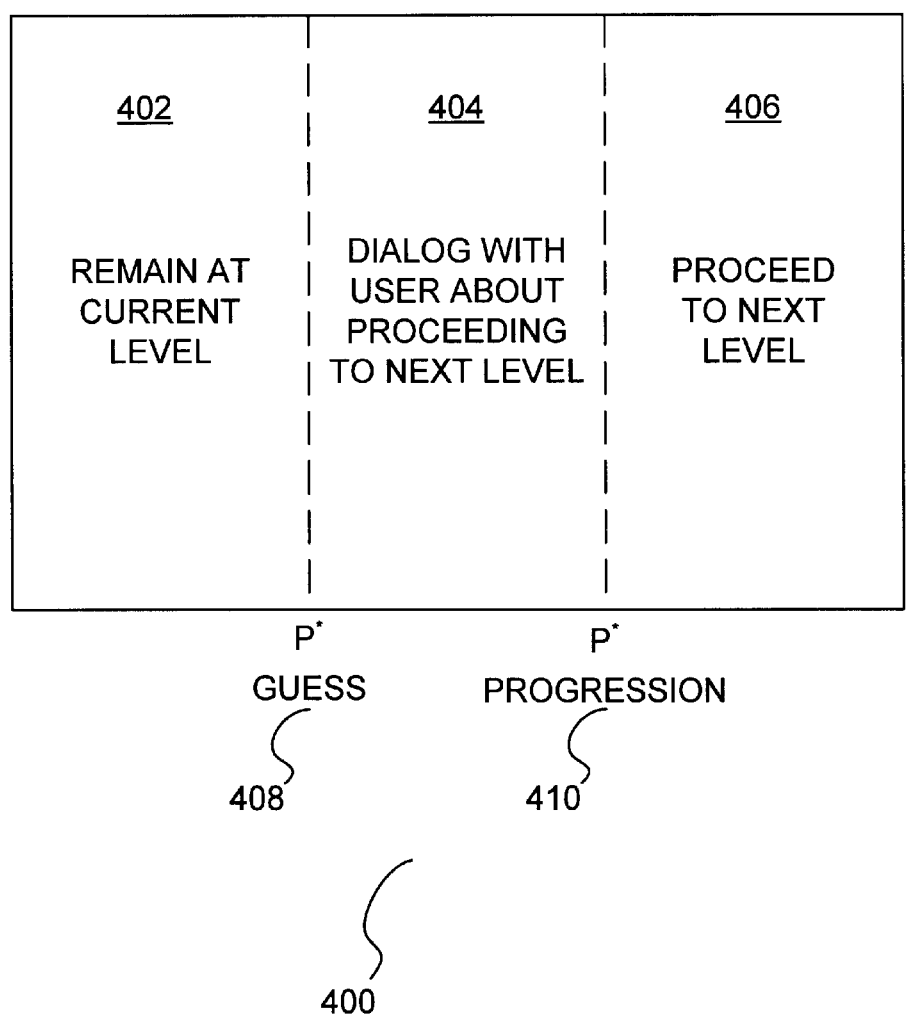
FIG. 4(a) is a diagram showing the thresholds p* progression and p* guess, according to an embodiment of the invention.

Further understanding of the various thresholds p* guess, p* progression and p* return is made by reference to FIGS. 4(a) and 4(b), which are diagrams of the inter-relationship of these thresholds. In FIG. 4(a), for example, the mapping 400 is such that, as the first inference probability increases from left to right, different regions 402, 404 and 406 are entered into, where the regions are demarcated by p* guess 408 and p* progression 410. Thus, if the inference probability is less than p* guess 408, then the method remains at the current level, since the probability lies in region 402. If the inference probability is greater than p* guess 408 but less than p* progression 410, then a dialog is entered into with the user as to whether the next level should be proceeded to, since the probability lies in region 404. Finally, if the inference probability is greater than p* progression 410, then the next level is automatically proceeded to, since the probability lies in region 406.

Figure 4B:
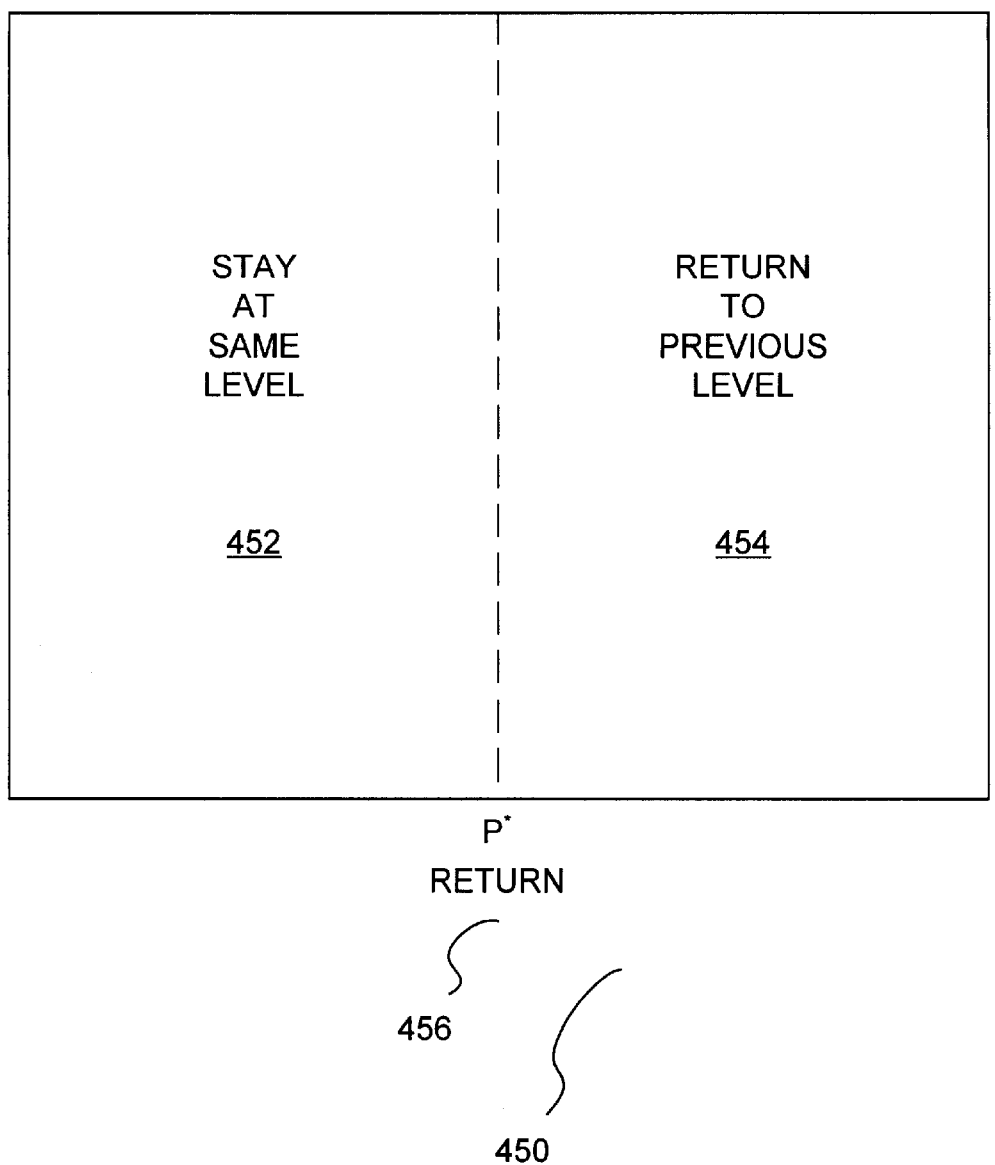
FIG. 4(b) is a diagram showing the threshold p* return, according to an embodiment of the invention.

Similarly, as shown in FIG. 4(b), the mapping 450 is such that as the second inference probability increased from left to right, different regions 452 and 454 are entered into, as demarcated by p* return 456. Thus, if the second inference probability is less than p* return 456, then the method stays at the same level, since the probability lies in region 452. If the second inference probability is greater than p* return 456, then the method returns to the previous level 454, since the probability lies in the region 454 (in one embodiment, in returning back to the previous level, an appropriate apology or justification is provided, to ensure naturalness of the conversation). Those of ordinary skill within the art can appreciate that a third region can be added to FIG. 4(b) for dialog with the user about retreating to the previous level, similar to the three regions of FIG. 4(a), and likewise the dialog region of FIG. 4(a) can be removed, similar to the two regions of FIG. 4(b).

The various thresholds p* guess, p* progression and p* return can be user-defined, or determined through the use of decision theory—that is, the thresholds can be determined via context-sensitive cost calculations. Costs used in the computation can be made functions of such observation as the user being hurried, and can also be made functions of observations about the conversational dialog itself, including the number of questions that have already been asked of users, etc. For example, asking one question about a user's request may initially incur little cost. However, if the system has to ask multiple questions about the same request, it may be more costly to ask another question than to just take action.

The setting of thresholds p* generally, and of using decision theory to set them specifically, is described in the coassigned and copending patent application entitled "Directing Automated Services for Messaging and Scheduling," filed on Apr. 20, 1999, Ser. No. 09/295,146, which is hereby incorporated by reference. However, the invention is not so limited.

The method of FIG. 5 can be summarized by the following description. The method performs cost-benefit analysis to guide decisions about progression to the next level of detail, or to return to a previously examined level, based on inferred probabilities of goals within a level. Within the analysis, the expected value of directly progressing or asking a question to confirm a goal is considered, versus remaining at the current level of analysis and continuing to gather information based on VOI. The utilities of different conversational outcomes are assessed, and an approximate decision analysis to compute threshold probabilities for progression, is employed seeking confirmation, or backtracking to a previously visited level. Beyond derivation via consideration of the utility of outcomes, such threshold probabilities can be assessed directly.

Three thresholds in particular are used, p* progress, p* guess, and p* return. If the probability of the goal with the highest likelihood does not exceed p* guess or p* progress, the system continues to perform VOI to gather additional information about the goals. If VOI becomes non-positive or there are no other observations to make, the system issues a request for additional information. Should the maximal likelihood goal at the current level exceed p* progress, the system will assume the goal and move to the next level of detail. Should the maximal likelihood exceed p* guess, but not exceed p* progress, the system will engage the user to confirm or rule out the goal. Following a crisp disconfirmation of a goal, a probability of zero is assigned to that goal and the probability distribution for the remaining feasible goals is renormalized. The p* threshold for returning is used in making a decision to return to a higher level of detail. The Bayesian models for goal disambiguation at levels more detailed than Level 0 include a return hypothesis. Should the probability of all subgoals decrease and the likelihood of the return hypothesis become greater than p* return, the system returns to the previous level. In such situations, the system apologizes for the misunderstanding and either continues VOI at the previous level or asks for more information if that VOI is non-positive.

More Generalized Approach to the Navigation of Levels within the Hierarchy

In this section of the detailed description, a more generalized decision-analytic approach to the navigation of levels within the hierarchy is described. That is, in the previous section the navigation of levels within the hierarchy was described in relation to the determination of inference probabilities, and taking action (navigating levels) based on those inference probabilities exceeding or not exceeding certain thresholds. However, as can be appreciated by those of ordinary skill within the art, this is one specific decision-analytic manner of what can be referred to as the computation of ideal action under uncertainty, given the consideration of the utilities associated with each outcome. That is, the description provided in the previous section is a specific embodiment of the more generalized approach to navigating levels that is now described.

In the generalized approach, a probability distribution over all the goals represented by a task at the current level of the hierarchy is first determined, for example, by use of a Bayesian network as known within the art. Next, the action of maximum expected value associated with the probability distribution is determined. The value for immediate action of an action A* is its expected utility, which can be written as:

$$eu(A^*) = \max_A \Sigma_j u(A_i, H_j) p(H_j|E)$$

where $\max_A$ indicates the selecting of an action A to a maximize the summation, $u(A_i, H_j)$ is the utility of the particular action $A_i$ when the user has the goal $H_j$ and $p(H_j|E)$ is the probability of user goal $H_j$ given the current set of observed and background evidence E. We use A* to refer to the action A with the maximum expected utility, obtained by taking the arg $\max_a$ of the above equation.

The actions to be considered by the generalized approach are the same as the more specific approach described in the previous section. That is, the expected utility of each of the actions progressing to a next level, retreating to a prior level, and dialog about each of progressing and retreating are determined. The action of the maximum expected value associated within the probability distribution is then followed.

Furthermore, in an additional embodiment, the decision-theoretic approach just described encompasses all actions—not just navigation of levels. Thus, a decision-theoretic approach is used to choose among the actions: get more information implicitly; get more information explicitly; progress to the next level; retreat to the previous level; progress to the next level with user confirmation; and, retreat to the previous level with user confirmation. Those of ordinary skill within the art can then appreciate that any approximation can be used for any aspect of the decision-making process, such as using a single probability, such as the inference probability determinations described elsewhere in the application. Thus, using the more general decision-theoretic approach, an action is selected, and then followed (i.e., effected)—and this process continues until the cost of continuing the conversational interaction outweigh the benefits, at which time some action may be taken in the world which in accordance with the overall goal of maximizing expected utility under uncertainty.

System

Figure 6:
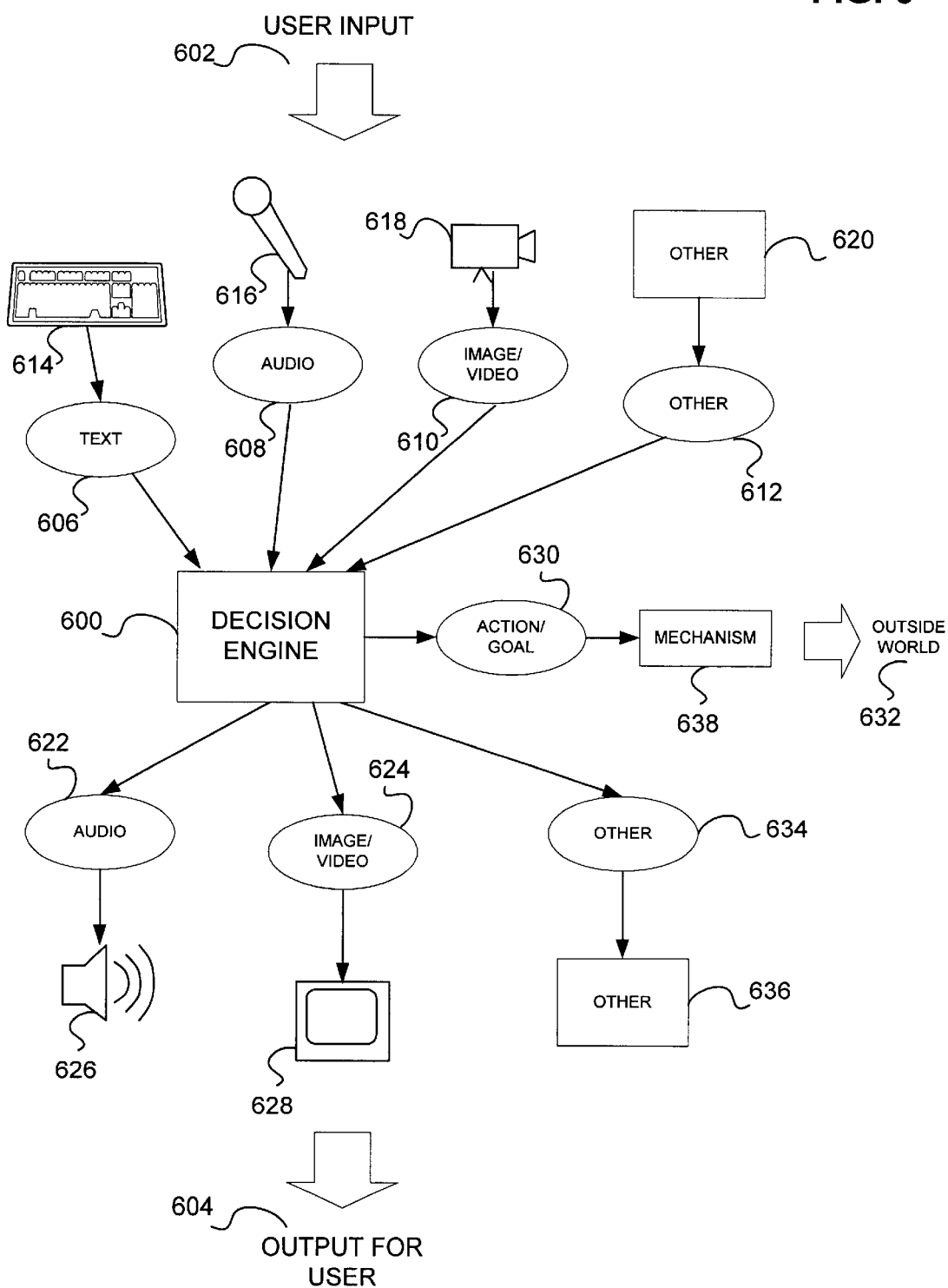

In this section of the detailed description, a system according to an embodiment of the invention is described. The system is described in conjunction with FIG. 6, which is a diagram of a system according to one embodiment of the invention. FIG. 6 is now referred to.

The decision engine 600 on a general level receives user input 602 and provides output for the user 604 in an iterative manner to assess the goal of the user in the context of a computer-user interaction environment (e.g., such that an action has been chosen and made). The result is the assessing of the user's goal 630, which can in one embodiment be an action based on the goal to be performed by a mechanism 638, such that the outside world 632 is affected by the action. The decision engine 600 navigates a task abstraction hierarchy of levels, comprising a series of levels, where each level has at least one goal for each of the goals of a previous level, as has been described (e.g., via the use of one or more Bayesian networks), in order to assess the user's goal. The decision engine 600 in one embodiment is a computer program executed by a processor from a computer-readable medium of a computer, although the invention is not so limited.

The user input 602 can be inputted into the decision engine 600 via a number of different mechanisms. For example, text input can be retrieved via a keyboard 614; audio input can be retrieved via a microphone 616; image/video information can be retrieved via a video camera 618; and other information 612 can be retrieved via other mechanisms 620. Similarly, the user output 604 can be output by the decision engine 600 via a number of different mechanisms. Audio output 622 can be output via a speaker 626; image/video output 624 can be output via a display device 628 such as a monitor; and other output 634 can be output via other mechanisms 636. The invention is not so limited.

The mechanism 638 for effecting an action based on the goal 630 can itself by one of the output mechanisms such as the speaker 626, the display device 628, or the other mechanisms 636, although the invention is not so limited. The mechanism 638 provides for the effectuation of an goal based on the goal 630 assessed by the decision engine 600 to the outside world 632. For example, within the context of a receptionist domain, where the goal of the user is determined to be the needing of a shuttle to another campus, the mechanism 638 may be a text-to-speech engine that calls up a shuttle center via a phone to request the shuttle.

Atypical Levels of Analysis

In this section of the detailed description, atypical levels of analysis are presented. These atypical levels may be utilized in accordance with other embodiments of the invention that have previously been described in the application. However, the invention is not so limited.

Initially, it is noted that context-sensitive utilities can be used in the computation of threshold probabilities, and that value of information (VOI) can be defined as functions of such observations as the user being hurried, or of observations about the conversational dialog itself such as the number of questions that have already been asked of users.

In one embodiment, therefore, a special class of probability-sensitive costs for controlling VOI can be made use of when deliberating about asking users questions at levels of detail that are marked as atypical levels of analysis. An example of an atypical level of analysis is a second level associated with the high-level goal of desiring a shuttle to travel somewhere on a corporate campus. This second level may seek to discover whether a person needs a special kind of shuttle, including the need for a vehicle that can transport handicapped individuals or a special shuttle for senior executives.

Levels marked as atypical include a special goal state that represents the proposition that the level is irrelevant. Engaging users about subgoals at this level would appear unnatural in most cases. Thus, the expected cost used in the VOI analysis is dynamically updated by considering the probability that an atypical result is relevant. The probability of relevance given evidence, $p(R|E)$, is the complement of the probability assigned to the state irrelevant. As the probability of relevance increases, the naturalness of being asked increases, making a question less surprising, and, thus, less costly to ask.

In one embodiment, the expect cost of asking is computed as the sum of the costs for the outcomes of the level being relevant and irrelevant, weighted by the inferred probabilities, as follows:

$$\text{Expected Cost} = p(R|E) \, \text{Cost}(\text{Asking, Relevant}) + 1 - p(R|E) \, \text{Cost}(\text{Asking, not Relevant})$$

where cost(Asking, Relevant) is the cost of asking a question about an atypical situation when the level is relevant and Cost(Asking, not Relevant) is the cost of asking when the level is irrelevant. This expected cost can thus be used in VOI for explicit question asking (versus those centering on gather of visual clues) in atypical levels of detail.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   receiving information regarding a current level of a task abstraction hierarchy of levels to assess a goal of a user within a computer-user interaction context;

determining a sufficiency of the information received based on a decision-analytic approach;

upon determining that the information received is sufficient, selecting an action based on a decision-analytic approach.

2. The method of claim 1, wherein selecting an action based on a decision analytic approach comprises determining a probability distribution over goals represented by a task at the current level of the hierarchy.

3. The method of claim 2, wherein selecting an action further comprises determining an arg max of the probability distribution.

4. The method of claim 1, wherein selecting an action based on a decision-analytic approach comprises:

determining an inference probability;

upon determining that the inference probability exceeds a progression threshold, advancing the current level to a next level.

5. The method of claim 4, further comprising continuing to receive information regarding the current level until the goal of the user has been assessed.

6. The method of claim 1, wherein the task abstraction of levels includes at least one atypical level for which a probability of relevance and a probability of irrelevance is determined.

7. The method of claim 1, wherein receiving information regarding a current level comprises receiving information regarding a current level of the task abstraction hierarchy of levels, the task abstraction hierarchy comprising a series of levels, each level comprising at least one goal for each of at least one of the at least one goal of a previous level.

8. The method of claim 1, wherein receiving information comprises receiving information of at least one information type of a group of information types essentially consisting of: a text information type; an audio information type; an image/video information type; and, an other information type.

9. The method of claim 1, wherein receiving information comprises interacting with the user.

10. The method of claim 9, wherein interacting with the user comprises initially providing the user with second information.

11. The method of claim 10, wherein providing the user with second information comprises providing the user with second information of at least one second information type of a group of second information types essentially consisting of: an audio second information type; an image/video second information type; and, an other second information type.

12. The method of claim 1, wherein determining a sufficiency of the information received comprises performing a value-of-information analysis.

13. The method of claim 12, wherein performing a value-of-information analysis comprises performing a greedy value of information analysis.

14. The method of claim 12, wherein performing a value-of-information analysis comprises determining whether an expected cost to receive additional information exceeds an expected benefit of the additional information.

15. The method of claim 4, wherein determining an inference probability comprises:

determining an initial inference probability for each of the at least one goal of a next level to the current level; and, selecting as the inference probability the initial inference probability of the goal of the at least one goal of the next level to the current level having a highest inference probability.

16. The method of claim 15, wherein determining an initial inference probability for each of the at least one goal of a next level to the current level comprises determining the initial inference probability for each of the at least one goal of the next level to the current level by use of a Bayesian network.

17. The method of claim 15, wherein advancing the current level to a next level comprises advancing to the goal of the at least one goal of the next level to the current level having a highest inference probability.

18. The method of claim 4, further comprising, upon determining that the information received is sufficient, and subsequent to upon determining that the inference probability exceeds a progression threshold, advancing the current level to a next level, upon determining that the inference probability exceeds a dialog threshold, engaging the user in a dialog about whether to proceed to the next level; and, upon receiving confirmation from the user to proceed to the next level, advancing the current level to the next level.

19. The method of claim 4, further comprising, upon determining that the information received is sufficient, and subsequent to upon determining that the inference probability exceeds a progression threshold, advancing the current level to a next level, determining a second inference probability; and, upon determining that the second inference probability exceeds a return threshold, retreating the current level to a previous level.

20. The method of claim 19, wherein determining a second inference probability comprises determining the second inference probability as a probability of a goal of returning to the previous level.

21. The method of claim 19, wherein determining a second inference probability comprises determining the second inference probability by use of a Bayesian network.

22. A computer-implemented method comprising:

receiving information regarding a current level of a task abstraction hierarchy of levels to assess a goal of a user within a computer-user interaction context;

determining a sufficiency of the information received by performing a value-of-information analysis;

upon determining that the information received is sufficient, determining an inference probability;

upon determining that the inference probability exceeds a progression threshold, advancing the current level to a next level;

determining a second inference probability;

upon determining that the second inference probability exceeds a return threshold, retreating the current level to a previous level; and, continuing to receive information regarding the current level until the goal of the user has been assessed.

23. The method of claim 22, wherein receiving information regarding a current level comprises receiving information regarding a current level of the task abstraction hierarchy of levels, the task abstraction hierarchy comprising a series of levels, each level comprising at least one goal for each of at least one of the at least one goal of a previous level.

24. The method of claim 22, wherein receiving information comprises interacting with the user.

25. The method of claim 22, wherein performing a value-of-information analysis comprises determining whether an expected cost to receive additional information exceeds an expected benefit of the additional information.

26. The method of claim 23, wherein determining an inference probability comprises:
   determining an initial inference probability for each of the at least one goal of a next level to the current level by use of a Bayesian network; and,
   selecting as the inference probability the initial inference probability of the goal of the at least one goal of the next level to the current level having a highest inference probability.

27. The method of claim 23, wherein advancing the current level to a next level comprises advancing to the goal of the at least one goal of the next level to the current level having a highest inference probability.

28. The method of claim 22, further comprising, upon determining that the information received is sufficient, and subsequent to upon determining that the inference probability exceeds a progression threshold, advancing the current level to a next level,
   upon determining that the inference probability exceeds a second probability threshold,
      engaging the user in a dialog about whether to proceed to the next level; and,
      upon receiving confirmation from the user to proceed to the next level, advancing the current level to the next level.

29. The method of claim 22, wherein determining a second inference probability comprises determining the second inference probability as a probability of a goal of returning to the previous level by use of a Bayesian network.

30. A machine-readable medium having instructions stored thereon for execution by a processor to perform a method comprising:
   receiving information regarding a current level of a task abstraction hierarchy of levels to assess a goal of a user within a computer-user interaction context;
   determining a sufficiency of the information received;
   upon determining that the information received is sufficient,
      determining an inference probability;
      upon determining that the inference probability exceeds a progression threshold, advancing the current level to a next level; and,
   continuing to receive information regarding the current level until the goal of the user has been assessed.

31. The medium of claim 30, wherein receiving information regarding a current level comprises receiving information regarding a current level of the task abstraction hierarchy of levels, the task abstraction hierarchy comprising a series of levels, each level comprising at least one goal for each of at least one of the at least one goal of a previous level.

32. The medium of claim 30, wherein receiving information comprises interacting with the user.

33. The medium of claim 30, wherein determining a sufficiency of the information received comprises performing a value-of-information analysis.

34. The medium of claim 33, wherein performing a value-of-information analysis comprises performing a greedy value of information analysis.

35. The medium of claim 33, wherein performing a value-of-information analysis comprises determining whether an expected cost to receive additional information exceeds an expected benefit of the additional information.

36. The medium of claim 30, wherein determining an inference probability comprises:
   determining an initial inference probability for each of the at least one goal of a next level to the current level by use of a Bayesian network; and,
   selecting as the inference probability the initial inference probability of the goal of the at least one goal of the next level to the current level having a highest inference probability.

37. The medium of claim 36, wherein advancing the current level to a next level comprises advancing to the goal of the at least one goal of the next level to the current level having a highest inference probability.

38. The medium of claim 30, further comprising, upon determining that the information received is sufficient, and subsequent to upon determining that the inference probability exceeds a progression threshold, advancing the current level to a next level,
   upon determining that the inference probability exceeds a dialog threshold,
      engaging the user in a dialog about whether to proceed to the next level; and,
      upon receiving confirmation from the user to proceed to the next level, advancing the current level to the next level.

39. The medium of claim 30, further comprising, upon determining that the information received is sufficient, and subsequent to upon determining that the inference probability exceeds a progression threshold, advancing the current level to a next level,
   determining a second inference probability of a goal of returning to the previous level by use of a Bayesian network; and,
   upon determining that the second inference probability exceeds a return threshold, retreating the current level to a previous level.

40. A machine-readable medium having instructions stored thereon for execution by a processor to perform a method comprising:
   receiving information regarding a current level of a task abstraction hierarchy of levels to assess a goal of a user within a computer-user interaction context, the task abstraction hierarchy comprising a series of levels, each level comprising at least one goal for each of at least one of the at least one goal of a previous level;
   determining a sufficiency of the information received by performing a value-of-information analysis;
   upon determining that the information received is sufficient,
      determining an initial inference probability for each of the at least one goal of a next level to the current level by use of a Bayesian network;
      selecting as an inference probability the initial inference probability of the goal of the at least one goal of the next level to the current level having a highest inference probability;
      upon determining that the inference probability exceeds a progression threshold, advancing the current level to a next level;
      determining a second inference probability of a goal of returning to the previous level by use of a Bayesian network;
      upon determining that the second inference probability exceeds a return threshold, retreating the current level to a previous level; and,
   continuing to receive information regarding the current level until the goal of the user has been assessed.

41. The medium of claim 40, wherein receiving information comprises interacting with the user.

42. The medium of claim 40, wherein performing a value-of-information analysis comprises determining whether an expected cost to receive additional information exceeds an expected benefit of the additional information.

43. The medium of claim 40, wherein advancing the current level to a next level comprises advancing to the goal of the at least one goal of the next level to the current level having a highest inference probability.

44. The medium of claim 40, further comprising, upon determining that the information received is sufficient, and subsequent to upon determining that the inference probability exceeds a progression threshold, advancing the current level to a next level, upon determining that the inference probability exceeds a dialog threshold,
engaging the user in a dialog about whether to proceed to the next level; and,
upon receiving confirmation from the user to proceed to the next level, advancing the current level to the next level.

45. A computerized system comprising:

at least one source of user information;

at least one destination for output to a user;

a decision engine operatively coupled to the at least one source and the at least one destination to assess a goal of the user within a computer-user interaction context via navigation of a task abstraction hierarchy of levels.

46. The system of claim 45, further comprising a mechanism to provide for action based on the goal of the user assessed by the decision engine.

47. The system of claim 45, wherein the at least one source comprises at least one of the following: a keyboard, a microphone, and a video camera.

48. The system of claim 45, wherein the at least one destination comprises at least one of the following: a speaker, and a display device.

49. The system of claim 45, wherein the task abstraction hierarchy comprises a series of levels, each level comprising at least one goal for each of at least one of the at least one goal of a previous level.

50. The system of claim 45, wherein the decision engine accomplishes navigation of the task abstraction hierarchy via use of at least one Bayesian network.

51. The system of claim 45, wherein the decision engine comprises a computer program executed by a processor from a computer-readable medium.

52. A computer-implemented method comprising:

using a decision-analytic approach to select an action from the group of actions relating to assessment of a goal of a user within a computer-user interaction context, the group comprising: obtaining information; progressing to a next level of a task abstraction hierarchy of levels; and, retreating to a previous level of the task abstraction hierarchy;

effecting the selected action; and, repeating until one of the goal of the user has been assessed and the costs of continuing conversation outweigh the benefits.

53. The method of claim 52, wherein obtaining information comprises obtaining information implicitly and obtaining information through explicit querying of the user.

54. The method of claim 52, wherein progressing to a next level comprises progressing to the next level following acquisition of confirmation from the user.

55. The method of claim 52, wherein retreating to a previous level comprises retreating to the previous level following an attempt to seek confirmation from the user.

* * * * *